US010385871B2

(12) United States Patent
Lurie et al.

(10) Patent No.: US 10,385,871 B2
(45) Date of Patent: Aug. 20, 2019

(54) METHOD AND SYSTEM FOR COMPRESSOR VANE LEADING EDGE AUXILIARY VANES

(71) Applicant: General Electric Company, Schenectady, NY (US)

(72) Inventors: David Paul Lurie, Liberty Township, OH (US); Sherif Alykadry Abdelfattah, Mason, OH (US); Michael Julian Castillo, Liberty Township, OH (US); Anthony Louis DiPietro, Jr., Maineville, OH (US); Aspi Rustom Wadia, Loveland, OH (US)

(73) Assignee: General Electric Company, Schenectady, NY (US)

( * ) Notice: Subject to any disclaimer, the term of this patent is extended or adjusted under 35 U.S.C. 154(b) by 269 days.

(21) Appl. No.: 15/601,613

(22) Filed: May 22, 2017

(65) Prior Publication Data

US 2018/0335050 A1     Nov. 22, 2018

(51) Int. Cl.
| | |
|---|---|
| *F04D 27/00* | (2006.01) |
| *F04D 29/32* | (2006.01) |
| *F04D 29/52* | (2006.01) |
| *F04D 29/54* | (2006.01) |
| *F04D 29/56* | (2006.01) |
| *F01D 5/14* | (2006.01) |

(52) U.S. Cl.
CPC ........... *F04D 29/542* (2013.01); *F01D 5/146* (2013.01)

(58) Field of Classification Search
CPC .......... F01D 5/146; F02C 3/04; F04D 27/002; F04D 27/009; F04D 29/321; F04D 29/542; F04D 29/522; F04D 29/563
See application file for complete search history.

(56) References Cited

U.S. PATENT DOCUMENTS

| | | | |
|---|---|---|---|
| 5,152,661 A * | 10/1992 | Sheets | F01D 5/145 415/84 |
| 6,910,855 B2 * | 6/2005 | Dailey | F01D 5/146 415/151 |
| 7,841,828 B2 | 11/2010 | Liang | |
| 7,887,297 B2 | 2/2011 | Allen-Bradley et al. | |
| 8,182,204 B2 * | 5/2012 | Durocher | F01D 9/06 415/115 |
| 8,342,803 B2 | 1/2013 | Grohens et al. | |

(Continued)

OTHER PUBLICATIONS

Joslyn, H. David, and Robert P. Dring. "Negative Incidence Flow Over a Turbine Rotor Blade." In ASME 1983 International Gas Turbine Conference and Exhibit, pp. V001T01A011-V001T01A011. American Society of Mechanical Engineers, 1983.

(Continued)

*Primary Examiner* — Igor Kershteyn
(74) *Attorney, Agent, or Firm* — General Electric; Pamela Kachur

(57) ABSTRACT

An apparatus and method of managing negative incidence in a compressor is provided. The apparatus includes a first row of stationary main vanes, and a second row of stationary auxiliary vanes extending radially inwardly from a stationary casing of the compressor proximate the leading edges of the main vanes. A flow channel is defined between a pressure side of an auxiliary vane of the second row of auxiliary vanes and a suction side of an adjacent main vane of the row of main vanes.

23 Claims, 4 Drawing Sheets

(56) References Cited

U.S. PATENT DOCUMENTS

| | | | |
|---|---|---|---|
| 8,403,645 | B2 | 3/2013 | Barnes et al. |
| 8,459,956 | B2 | 6/2013 | Pandey et al. |
| 8,727,725 | B1 | 5/2014 | Liang |
| 9,103,213 | B2 | 8/2015 | Barr et al. |
| 2007/0154314 | A1* | 7/2007 | Jarrah ............ F04D 29/327 416/203 |
| 2013/0051996 | A1* | 2/2013 | Hoeger ............ F01D 9/06 415/185 |
| 2013/0224027 | A1 | 8/2013 | Barr |
| 2014/0245741 | A1* | 9/2014 | He ............ F01D 5/141 60/746 |
| 2014/0255159 | A1* | 9/2014 | Paradis ............ F01D 9/02 415/115 |
| 2014/0328675 | A1* | 11/2014 | Derclaye ............ F01D 5/142 415/194 |
| 2014/0348660 | A1* | 11/2014 | Guendogdu ............ F01D 5/145 416/242 |

OTHER PUBLICATIONS

Schneider, Tim, and Dragan Kožulović. "Flow characteristics of axial compressor tandem cascades at large off-design incidence angles." In ASME Turbo Expo 2013: Turbine Technical Conference and Exposition, pp. V06AT35A011-V06AT35A011. American Society of Mechanical Engineers, 2013.

Belamadi, Riyadh, Abdelouaheb Djemili, Adrian Ilinca, and Ramzi Mdouki. "Aerodynamic performance analysis of Blotted airfoils for application to wind turbine blades." Journal of Wind Engineering and Industrial Aerodynamics 151 (2016): 79-99.

* cited by examiner

METHOD AND SYSTEM FOR COMPRESSOR VANE LEADING EDGE AUXILIARY VANES

STATEMENT REGARDING FEDERALLY SPONSORED RESEARCH AND DEVELOPMENT

The disclosure herein was made with Government support under contract number FA8650-15-D-2501 awarded by the Department of Defense (DOD), Air Force. The U.S. Government may have certain rights in this application and any resulting patents.

BACKGROUND

The field of the disclosure relates generally to gas turbine engines and, more particularly, to a method and system for managing negative incidence in variable cycle gas turbine engine high pressure compressor stator vanes using auxiliary vanes.

At least some known variable or adaptive cycle engines are configured to operate efficiently under mixed flight conditions, such as subsonic, transonic and supersonic and which can effectively change the compressor operating line in a controlled way. During the wide range of operational conditions, high pressure compressor stator vanes may operate at negative incidence, which can result in highly three dimensional separated flows on the pressure surface of the vanes of the high pressure compressor stator. The operation of compressor vanes at negative incidence in variable cycle engines can result in conditions that could adversely affect engine performance, efficiency, and/or operability or could shorten the life expectancy of the vanes.

One condition of operating at a negative incidence or operating at a negative incidence that exceeds a certain threshold is a bluff body type separation of the flow from the surface of the high pressure compressor vane. Such separation may introduce an undesirable vibratory mode to the vane or downstream vanes. Additionally, the separation may cause a significant loss in high pressure compressor and/or engine overall performance.

BRIEF DESCRIPTION

In one aspect, a row of stationary vane pairs for a high pressure compressor of a variable cycle gas turbine engine includes a first row of main vanes extending radially inwardly from a casing of the high pressure compressor and spaced circumferentially about a first axial location of the casing. Each main vane of the first row of main vanes includes a vane root coupled to the casing, a distal tip end, and a main vane extending therebetween. The main vane includes a first height from the casing to the distal tip end, a chord length between a leading edge of the main vane and a trailing edge of the main vane, and a thickness. The variable cycle aircraft gas turbine engine also includes a second row of auxiliary vanes extending radially inwardly from the casing and spaced circumferentially about a second axial location of the casing, wherein the second axial location is different from the first axial location. Each auxiliary vane of the second row of auxiliary vanes includes an auxiliary vane root coupled to the casing, a distal tip end, and an auxiliary vane body extending therebetween. The auxiliary vane includes a second height from the casing to the distal tip end, a chord length between a leading edge of the auxiliary vane and a trailing edge of the auxiliary vane, and a thickness. The variable cycle aircraft gas turbine engine further includes a flow channel defined between a pressure side of an auxiliary vane of the second row of auxiliary vanes and a suction side of an adjacent main vane of the first row of main vanes.

Optionally, the flow channel extends between the pressure side of the auxiliary vane and the suction side of the main vane from the leading edge of the main vane to the trailing edge of the auxiliary vane. Also optionally, the flow channel extends between the pressure side of the auxiliary vane and the suction side of the main vane from the leading edge of the main vane to a position forward of a local maximum thickness of the main vane. The leading edge of the auxiliary vane may be positioned axially forward of the leading edge of the main vane. Also optionally, The variable cycle aircraft gas turbine engine forms a later stage of the high pressure compressor. Optionally, the second height is approximately equal to the first height. Also optionally, the second height is less than the first height.

In another aspect, a method of managing negative incidence in a high pressure compressor includes channeling a flow of fluid to a row of a plurality of vane assemblies of the high pressure compressor, wherein the plurality of vane assemblies are spaced about a surface of a casing of the high pressure compressor. The plurality of vane assemblies includes a row of main vanes interdigitated with a row of auxiliary vanes. The method also includes channeling at least a portion of the flow of fluid through a flow channel defined by a pressure side of an auxiliary vane of the row of auxiliary vanes and a suction side of an adjacent main vane of the row of main vanes.

Optionally, the method includes channeling the flow of fluid along the pressure side of the high pressure compressor auxiliary vane before the flow of fluid enters the flow channel. Also optionally, the method includes maintaining a predetermined angle of incidence on the high pressure compressor main vanes using the flow of fluid through the flow channel. The method may also include maintaining an angle of incidence on the high pressure compressor main vanes less than or equal to sixty degrees. Optionally, the method includes maintaining an angle of incidence on the high pressure compressor main vanes less than or equal to twenty degrees. The method may also include maintaining a non-negative angle of incidence on the high pressure compressor main vanes using the flow of fluid through the flow channel.

In yet another aspect, a variable cycle gas turbine engine includes channeling a flow of fluid through a variable area device positioned to selectively control the flow of fluid through at least a portion of the variable cycle aircraft gas turbine engine that varies at least one of a bypass ratio (BPR) and a fan pressure ratio (FPR) of the variable cycle aircraft gas turbine engine. The variable cycle gas turbine engine also includes a high pressure compressor rotor assembly that includes one or more bladed members coupled through a shaft rotatable about a longitudinal axis, and a stationary high pressure compressor casing at least partially surrounding the high pressure compressor rotor assembly. A plurality of high pressure compressor vane pairs are spaced circumferentially about a first axial location of the stationary high pressure compressor casing. Each of a main vane and an auxiliary vane of the plurality of vane pairs includes a leading edge, a trailing edge, and a body extending therebetween. Each vane further includes a suction side and an opposing pressure side. A flow channel is defined between the pressure side of the auxiliary vane and the suction side of the main vane proximate the leading edge of the main vane.

Optionally, the flow channel extends between the pressure side of the auxiliary vane and the suction side of the main vane from the leading edge of the main vane to the trailing edge of the auxiliary vane. Also optionally, the flow channel extends between the pressure side of the auxiliary vane and the suction side of the main vane from the leading edge of the main vane to a position forward of a local maximum thickness of the main vane. The leading edge of the main vane may be positioned axially forward of the leading edge of the auxiliary vane. Optionally, the high pressure compressor rotor assembly comprises a high pressure compressor. Also optionally, the plurality of high pressure compressor vane pairs form a later stage of a high pressure compressor. The variable cycle gas turbine engine may be embodied in an adaptive cycle engine.

DRAWINGS

These and other features, aspects, and advantages of the present disclosure will become better understood when the following detailed description is read with reference to the accompanying drawings in which like characters represent like parts throughout the drawings, wherein.

Figure 1:
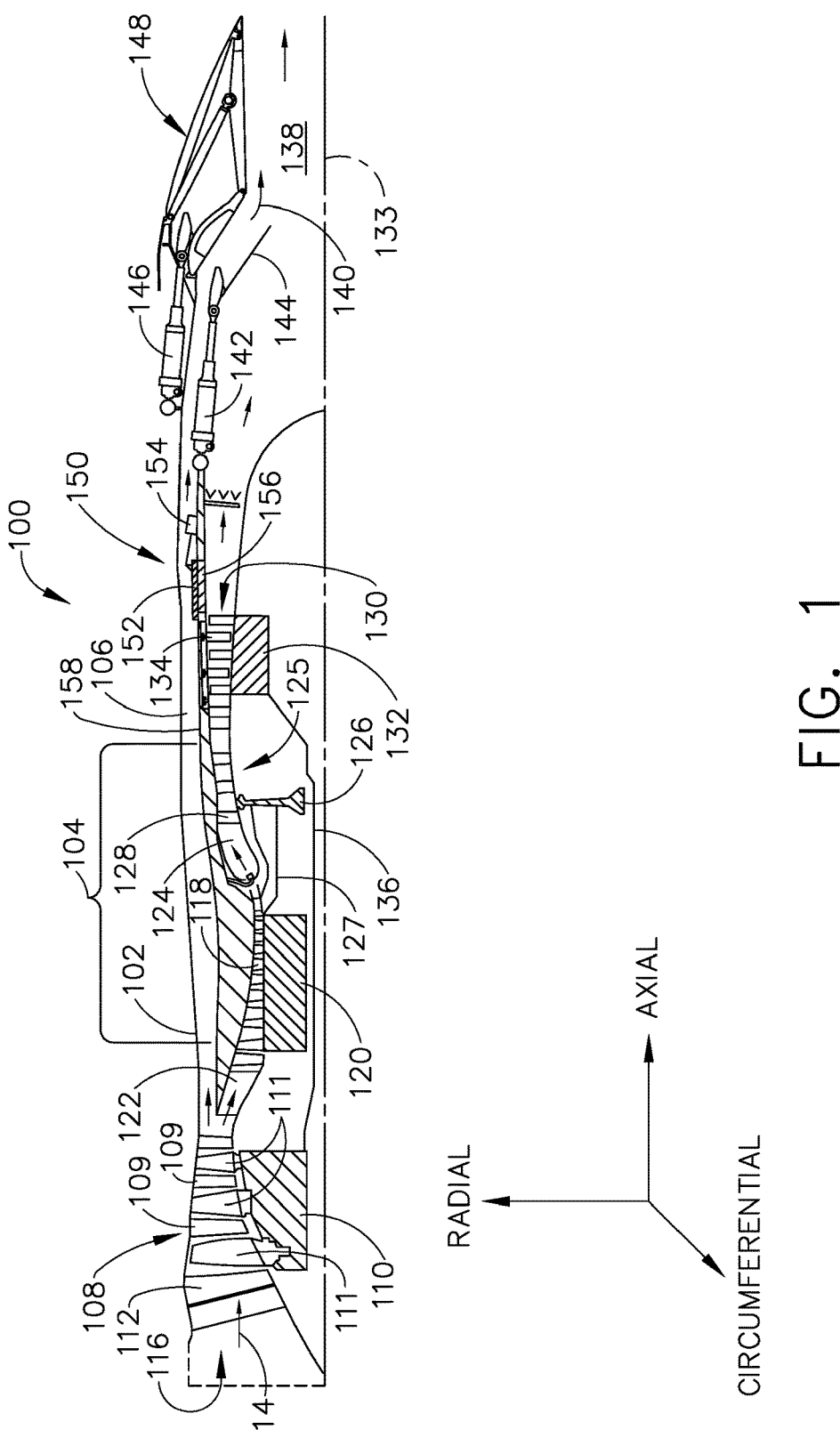
FIG. 1 is a cross-sectional view of a variable cycle gas turbine engine in accordance with an example embodiment of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, the term airfoil refers to stationary vanes typically found on, for example, casings of variable cycle aircraft gas turbine engine high pressure compressors. In some instances, airfoils, blades, and vanes may be used interchangeably. Additionally, although some reference may be made to rotor blades the present disclosure is applicable to stator or stationary vanes as well. In some embodiments, the stator vanes may be shrouded, in that the tips of the vanes are ganged together or coupled together by a shroud. The shroud may gang the radially inner tips of vanes that extend from the casing or from a radially outer ring coupled to the casing. The radially outer tips of vanes may be shrouded, in some embodiments.

A conventional multi-spool gas turbine engine has three basic parts in an axial, serial flow relationship: a core high pressure compressor to pressurize air entering into an inlet portion of the engine, a core combustor to add fuel and ignite the pressurized air into a propulsive gas flow, and a core turbine that is rotated by the propulsive gas flow, which in turn rotates the core high pressure compressor through a core shaft extending between the core turbine and the core high pressure compressor. The core high pressure compressor, the core turbine, the core combustor and the shaft are collectively referred to as the core engine.

Gas turbine engines intended for use in aircraft typically collect inlet air through an inlet cowling positioned at an upstream or front end of the engine. Typically, the propulsive gas flow is exhausted at a downstream or rear end of the engine through an exhaust nozzle, after flowing axially through the engine. The exhaust gas exits the nozzle at a higher velocity than the velocity of the inlet air thereby producing thrust with the net acceleration of the flow. A gas turbine engine that utilizes the core engine to accelerate all of the entering flow to produce thrust is typically referred to as a turbojet engine. The force, or thrust, generated by a turbojet is increased by either increasing the exhaust gas velocity or increasing the mass of air flowing through the engine. Gas turbine propulsive efficiency is directly related to the velocity of the exhaust leaving the engine in comparison with vehicle flight speed. Thus, turbojet engines with typically high exhaust velocities are well suited to producing high efficiency at supersonic speeds, and are somewhat inefficient at low speeds.

The thermodynamic efficiency of a turbojet engine can be altered by adding one or more lower pressure compressors upstream of the higher pressure core high pressure compressor; one or more lower pressure turbines downstream of the higher pressure core turbine; and low pressure shafts connecting the low pressure turbines and low pressure compressors. Such multi-spool engines increase the thermodynamic efficiency of turbojet engines, as the high pressure and lower pressure spools operate at their own optimum speeds and combine to deliver higher overall pressure ratio. Typically, multi-spool engines have either two spools (a low pressure spool and a high pressure spool) or three spools (a low pressure spool, an intermediate pressure spool, and a high pressure spool), but other configuration are possible. Described herein is a dual-spool gas turbine engine as one example of a multi-spool gas turbine engine. A person of ordinary skill in the art will recognize that the concepts that are discussed in the concept of a dual-spool gas turbine engine are equally applicable to a three-spool gas turbine engine or other multi-spool gas turbine engines.

A turbofan engine, another type of dual-spool gas turbine engine, couples a large diameter fan to the upstream end of the low pressure compressor. Some of the inlet air entering the engine bypasses the core engine and is simply accelerated by the fan to produce a portion of the engine's thrust, while the rest of the air is directed to the core engine to sustain the combustion process and produce an added component of thrust. The ratio of the amount of air going around the core engine to the amount of air passing through the core engine is known as the bypass ratio (BPR). The fan can be used to produce a substantial portion of the total thrust generated by the engine because thrust production is partially dependent on fan airflow and the fan pressure ratio (FPR), the ratio of fan discharge pressure to fan inlet pressure, rather than aircraft speed. The net exhaust velocity is affected by the mixed velocity of the relatively slow fan stream and the core stream and is therefore affected by bypass ratio. Thus, turbofans typically have large BPRs with low to moderate FPR and are well suited to producing high thrust at subsonic speeds, and are somewhat inefficient at high speeds.

Fundamentally, in comparing the two engine types at equivalent thrust levels, turbojet engines accelerate smaller quantities of air to extremely high exhaust velocities to produce thrust, while turbofan engines accelerate larger quantities of air to much lower velocities. Thus, aircraft gas turbine engines have historically been able to perform well—in terms of propulsive efficiency—at either subsonic speeds or supersonic speeds, but not both. At subsonic speeds, it is desirable to have a high BPR and low FPR. At supersonic speeds, it is desirable to have a low BPR and high FPR. Attempts have been made to incorporate the advantages of turbojet and turbofan engines into a single combined or variable cycle engine to achieve efficiency over a broad range of speeds.

In various embodiments, a variable cycle system operates by varying the bypass ratio of the engine for different flight regimes, allowing the engine to act like either a low bypass turbofan or nearly a turbojet. As a low bypass turbofan, the engine performs similarly to comparable engines. When needed, however, the engine directs more airflow through the hot core of the engine (like a turbojet), increasing the specific thrust of the engine. This makes the engine more efficient at high altitude, high thrust levels than a traditional low bypass turbofan. The changing geometry to achieve such performance also affects the angle of incidence of inlet air to the variable cycle aircraft gas turbine engine.

Embodiments of the negative incidence management techniques described herein provide a cost-effective method for reducing mechanical excitation of the affected row of high pressure compressor vanes and downstream rows of the variable cycle aircraft gas turbine engine high pressure compressor caused by bluff body type flow separation. Additionally, such techniques facilitate mitigating a reduced performance of the high pressure compressor and/or the variable cycle gas turbine engine caused by the separation. Each row of high pressure compressor vanes taking advantage of the negative incidence management techniques described herein includes a first row of high pressure compressor main vanes and a second row of high pressure compressor auxiliary vanes extending circumferentially about the stator or casing. In an exemplary embodiment, the high pressure compressor auxiliary vanes are smaller than the high pressure compressor main vanes and are positioned axially at least partially forward of the main vanes. The high pressure compressor auxiliary vanes are interdigitated with the high pressure compressor main vanes, such that the high pressure compressor main vanes and the high pressure compressor auxiliary vanes alternate circumferentially around the high pressure compressor stator or casing. A flow channel is thereby formed between each pair of high pressure compressor auxiliary vanes and high pressure compressor main vanes. Specifically, the flow channel is formed between a pressure side of a high pressure compressor auxiliary vane of the pair and a suction side of an adjacent high pressure compressor main vane of the pair that pulls incoming flow around the high pressure compressor auxiliary vane, between the high pressure compressor auxiliary vane and high pressure compressor main vane to prevent or reduce flow separation on the pressure side of the high pressure compressor main vane.

The operating line on a compressor map relates the flow and pressure ratio for a given speed at which the high pressure compressor operates. The operating line is generally set by the turbine nozzle area and the fuel flow temperatures across the combustor. Typically, during operation, the operating line is a fixed line that other component parameters are based on. As the operation of the high pressure compressor moves farther above the operating line, the high pressure compressor is closer to a stall condition. The high pressure compressor is designed to operate at approximately the operating line with a predetermined margin before the stall line. Typically, compressor operation does not move below the operating line, however, in a variable cycle engine, there may be a benefit to the overall cycle to operate significantly below the operating line, but such operation creates the negative incidence issue on, for example, the rear stages of the high pressure compressor.

FIG. 1 is a cross-sectional view of a variable cycle gas turbine engine 100 in accordance with an example embodiment of the present disclosure. Variable cycle gas turbine engine 100 can be an adaptive cycle or variable cycle engine. In the example embodiment, variable cycle gas turbine engine 100 includes an outer casing or outer nacelle 102 spaced apart from an inner core engine 104 so as to define an annular bypass duct 106 therebetween. Variable cycle gas turbine engine 100 includes a fan assembly 108 having stator vanes 109, a three-stage rotor assembly 110, including rotor blades 111, and inlet guide vanes 112 disposed between rotor stages and extending radially inward from the outer nacelle 102 for modulating the relative amounts of flow in the core engine flow stream and the bypass flow stream. Fan assembly 108 receives an inlet airflow 114 from an inlet opening 116, and thereupon pressurizes airflow 114, a portion of which is delivered to the core engine 104 and the remainder of which is directed to bypass duct 106. Inlet opening 116 is sized to accept a predetermined design airflow. Core engine 104 includes an axial flow high pressure compressor 118 having a high pressure compressor rotor assembly 120. Pressurized air entering high pressure compressor 118 through a flow annulus 122 is compressed and then discharged to a combustor 124 where fuel is burned to provide high energy combustion gases which drive a high pressure turbine 125 having a high pressure turbine rotor 126. High pressure turbine rotor 126 operates to extract kinetic energy from the high velocity core gas stream exiting combustor 124, and to convert this kinetic energy into torque for driving high pressure compressor rotor assembly 120 through a high pressure shaft 127. For the purpose of providing additional control of the core engine flow, variable pitch inlet guide vanes 128 may be provided upstream of high pressure turbine rotor 126.

Disposed downstream of high pressure turbine 125, in a position to receive the flow of hot gases leaving core engine 104, is a low pressure turbine 130, sometimes referred to as a power turbine. Low pressure turbine 130 includes a low pressure turbine rotor assembly 132 and variable pitch inlet guide vane sections 134. While low pressure turbine rotor assembly 132 has been illustrated as comprising three stages, it will be apparent to those skilled in the art that a smaller or greater number of stages may be utilized depending upon the turbine energy extraction potential required. Variable pitch inlet guide vane sections 134 operate to convert kinetic energy from the core stream into torque and to deliver this torque to low pressure turbine rotor assembly 132 which in turn drives low pressure turbine rotor assembly 132 through an upstream extending drive shaft 136 connected for rotation with rotor assemblies 110 and 132. High pressure shaft 127 and drive shaft 136 are rotatable about a longitudinal axis 133 of variable cycle gas turbine engine 100.

The cross-sectional flow area to low pressure turbine rotor assembly 132 is varied by varying the pitch of variable pitch inlet guide vane sections 134 which acts to vary the back pressure on high pressure turbine 125 and thereby control the high pressure turbine rotor speed. Propulsive force is obtained by the discharge of combustion gases from core engine 104 through a variable area core nozzle 138. Propulsive force is also obtained by the action of fan assembly 108 discharging air through variable area bypass nozzle 140 concentric to core nozzle 138. To assist in modulating the flow in bypass duct 106 and core engine 104, the area of bypass nozzle 140 and core nozzle 138 may be varied by a suitable variable geometry. As illustrated, the variable geometry may comprise a plurality of linear actuators 142 controlling hinged bypass nozzle flaps 144 and a second plurality of linear actuators 146 controlling a collapsible hinged wall assembly 148 to vary the cross-sectional area of core nozzle 138. Hinged bypass nozzle flaps 144 may be moved to a closed position, wherein variable area bypass nozzle 140 is obtruded such as that no flow is exhausted therefrom.

Aft of the low pressure turbine 130 there is provided an annular diverter valve 150. Diverter valve 150 may comprise a hinged panel 152 under control of a linear actuator 154. Hinged panel 152 covers a plurality of vanes 156 in the inner wall or nacelle 158 separating the bypass duct 106 and core engine 104, and which are curved to promote mixing of the core and bypass gas streams. In its open position, hinged panel 152 uncovers plurality of vanes 156 which permits the bypass flow to mix with the core stream. In its closed position, hinged panel 152 covers plurality of vanes 156 to prevent mixing of the core and bypass gas streams.

Diverter valve 150, in combination with the hinged bypass nozzle flaps 144, are used to switch the basic engine mode of operation between a separated flow, high bypass, low thrust cycle, to a mixed flow, low bypass, high thrust static pressure balanced cycle.

Figure 2:
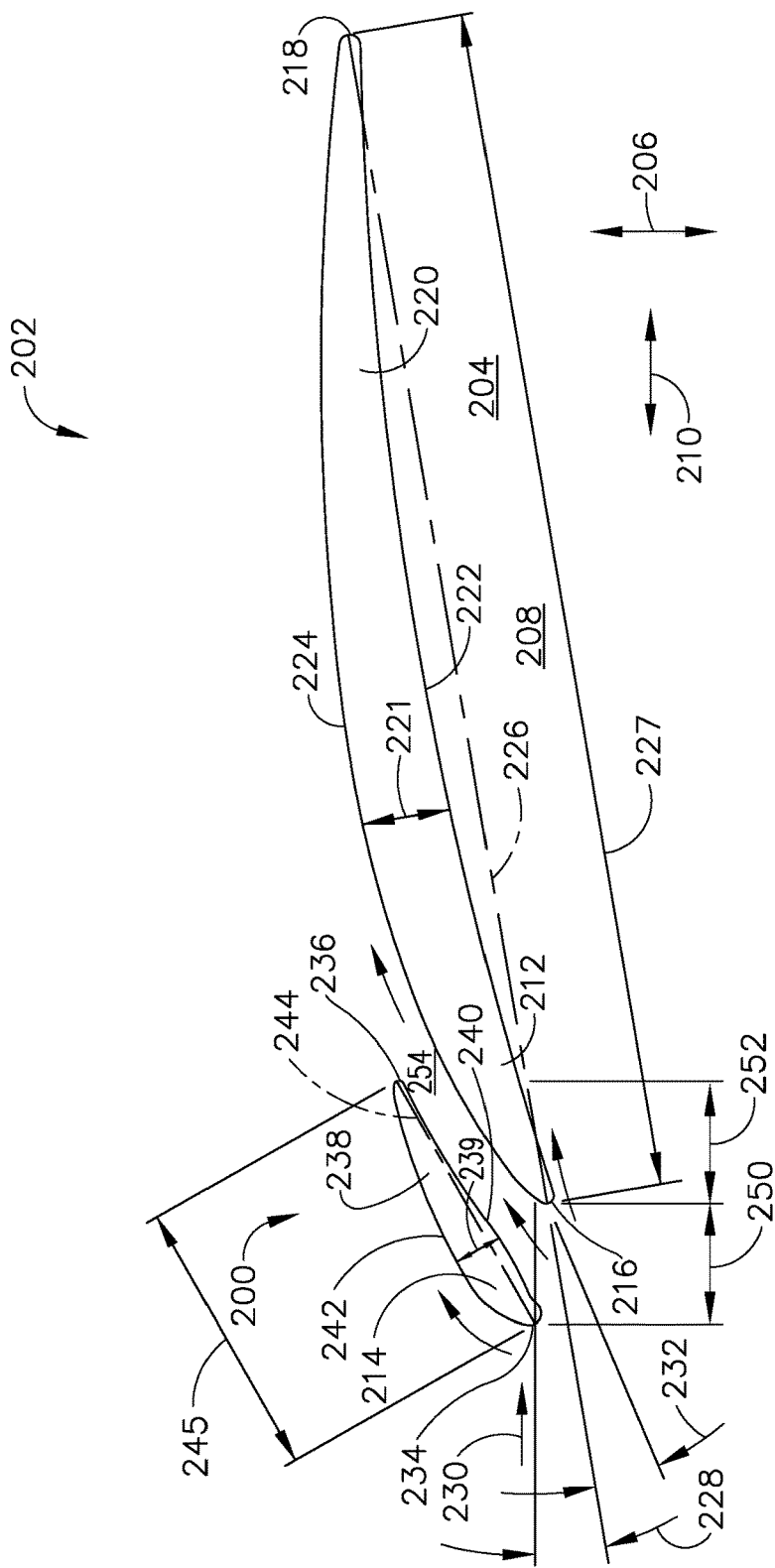
FIG. 2 is a plan view, looking radially inwardly, of a row of high pressure compressor vane pairs in accordance with an example embodiment of the present disclosure.
Figure 3:
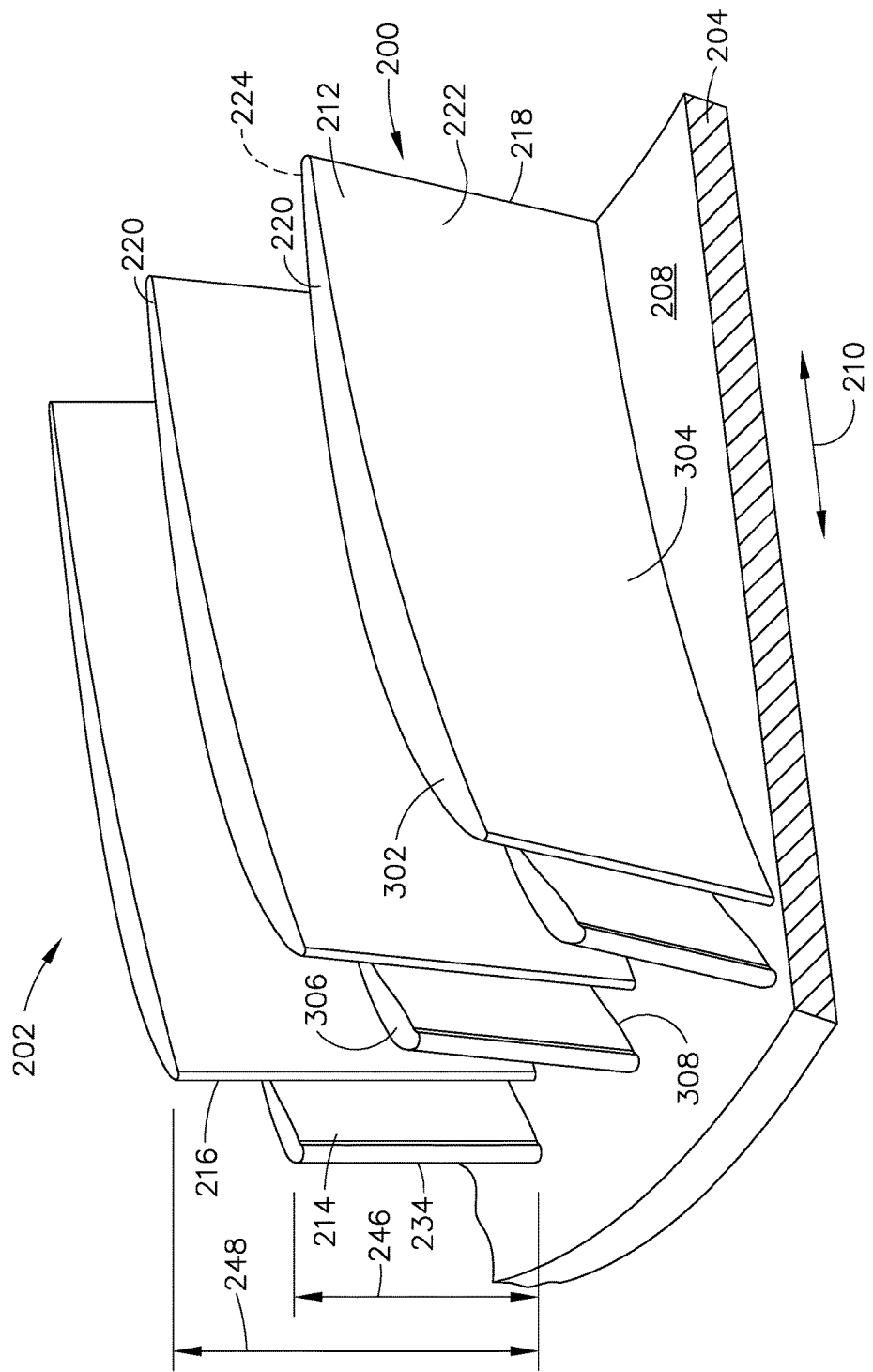
FIG. 3 is a perspective view of the row of high pressure compressor vane pairs shown in FIG. 2.

FIG. 2 is a plan view, looking radially outwardly, of a row 202 of stationary vane pairs 200 that may be used in high pressure compressor 118 of variable cycle gas turbine engine 100 in accordance with an example embodiment of the present disclosure. FIG. 3 is a perspective view of row 202 of stationary vane pairs 200. In the example embodiment, row 202 extends in a circumferential direction 206 about a radially inner surface 208 of a casing 204 of high pressure compressor 118 and in an axial direction 210 along radially inner surface 208 of casing 204. Row 202 of stationary vane pairs 200 may cooperate with an associated row of rotor blades (not shown in FIG. 2) to form a stage of high pressure compressor 118. Row 202 of stationary vane pairs 200 includes a first row of main vanes 212 interdigitated with a second row of auxiliary vanes 214. Each main vane 212 includes a leading edge 216, a trailing edge 218, and a main vane body 220 extending therebetween. Each main vane 212 also includes a main vane distal tip end 302, a main vane root 304, and main vane body 220 extending therebetween. A thickness 221 of main vane body 220 varies axially between leading edge 216 and trailing edge 218. Main vane 212 includes a pressure side 222 and a suction side 224. A chord line 226 extends between leading edge 216 and trailing edge 218 and defines a chord length 227. In one embodiment, an angle of incidence 228, 232 is defined as the angle between chord line 226 and a flow 230 entering row 202. In the example embodiment, flow 230 is illustrated as a straight axial flow, however, flow 230 can vary angularly through the many operational conditions experienced by variable cycle gas turbine engine 100 and high pressure compressor 118. For example, changing incoming flow 230 can result in positive angle of incidence 228, as illustrated in FIG. 2, or negative angle of incidence 232. An excessive negative angle of incidence 232 can cause flow separation on pressure side 222, in which flow along pressure side 222 undergoes a separation of the flow from pressure side 222, for example, a bluff body separation of a laminar flow.

Each auxiliary vane 214 includes a leading edge 234, a trailing edge 236, and an auxiliary vane body 238 extending therebetween. Each auxiliary vane 214 also includes an auxiliary vane distal tip end 306, an auxiliary vane root 308, and auxiliary vane body 238 extending therebetween. A thickness 239 of auxiliary vane body 238 varies axially between leading edge 234 and trailing edge 236. Auxiliary vane 238 includes a pressure side 240 and a suction side 242. A chord line 244 extends between leading edge 234 and trailing edge 236 and defines a chord length 245. In the example embodiment, as shown in FIG. 2, auxiliary vane 214 is dimensionally smaller than main vane 212, in that chord line 244 is shorter than chord line 226. A second height 246 of auxiliary vane 214 is shorter than a first height 248 of main vane 212. In alternative embodiments, auxiliary vane 214 is dimensionally larger than main vane 212, in that chord line 244 is longer than chord line 226. In other alternative embodiments, chord line 226 and 244 are of equal length.

In the example embodiment, main vane 212 is positioned at a first axial location and auxiliary vane 214 is positioned at a second axial location that is different from the first axial location. More specifically, in the example embodiment, auxiliary vane 214 is positioned upstream from main vane 212 by a first predetermined distance 250. Trailing edge 236 is spaced axially aftward from leading edge 216 a second predetermined distance 252. A flow channel 254 is defined along first predetermined distance 250 only by pressure side 240 and along second predetermined distance 252 by pressure side 240 and suction side 224.

A size and position of auxiliary vane 214 with respect to main vane 212 defines a size and shape of flow channel 254. In the example embodiment, flow channel 254 extends between pressure side 240 and suction side 224 from leading edge 216 of main vane 212 to trailing edge 236 of auxiliary vane 214. Moreover, in the example embodiment, flow channel 254 extends between pressure side 240 and suction side 224 from leading edge 216 of main vane 212 to a position forward of a local maximum thickness 221 of main vane 212. Flow channel 254 is configured to maintain a more positive angle of incidence 228 than would otherwise occur in the absence of flow channel 254. Flow channel 254 redirects flow at leading edge 216 towards suction side 224 thereby facilitating maintaining a more positive angle of incidence 228. In alternative embodiments, flow channel 254 extends to any suitable extent that enables row 202 to function as described herein.

In some embodiments, flow channel 254 facilitates maintaining a predetermined angle of incidence 228 on main vanes 212. For example, flow channel 254 facilitates maintaining angle of incidence 228 at less than or equal to sixty degrees. For another example, flow channel 254 facilitates maintaining angle of incidence 228 at less than or equal to twenty degrees. For another example, flow channel 254 facilitates maintaining angle of incidence 228 at a non-negative angle. In alternative embodiments, flow channel 254 facilitates maintaining angle of incidence 228 at any suitable value.

Although illustrated and described primarily with reference to rows of stationary vanes, for example, as used in machinery casings, the auxiliary vane concept also applies to rows of blades on a rotatable member. Additionally, the auxiliary vane concept applies to any stage of the machine including the first stage and later stages.

Figure 4:
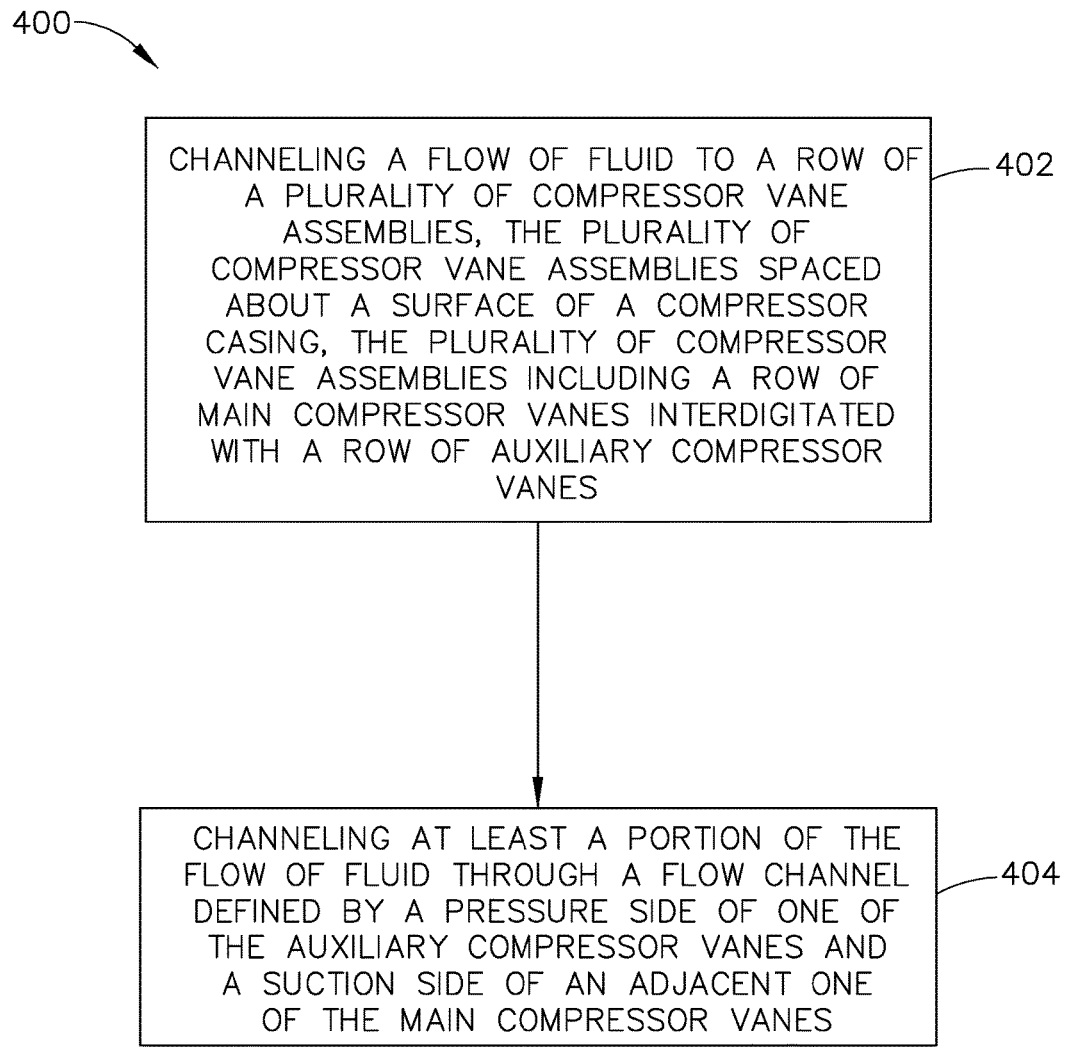
FIG. 4 is a flow chart of a method of managing negative incidence in a high pressure compressor.

FIG. 4 is a flow chart of a method 400 of managing negative incidence in a high pressure compressor. In the example embodiment, method 400 includes channeling 402 a flow of fluid to a row of a plurality of vane assemblies of the high pressure compressor. The plurality of vane assemblies are spaced circumferentially about a surface of a casing of the high pressure compressor. Each vane assembly of the plurality of vane assemblies includes a row of main vanes interdigitated with a row of auxiliary vanes. Method 400 also includes channeling 404 at least a portion of the flow of fluid through a channel defined by a pressure side of one of the auxiliary vanes and a suction side of an adjacent one of the main vanes.

The above-described rows of vane pairs, variable cycle gas turbine engines, and method provide an efficient technique for managing incidence in a variable cycle gas turbine engine high pressure compressor. Specifically, the above-described incidence management system includes a row of auxiliary vanes interdigitated with a row of main vanes to form a stationary portion of a stage of the variable cycle aircraft gas turbine engine high pressure compressor. A flow channel formed between the auxiliary vane and main vane pulls incoming flow around the auxiliary vane, between the auxiliary vane and main vane to prevent or reduce flow separation on the pressure side of the main vane.

The above-described embodiments of a method and apparatus for managing incidence in a variable cycle aircraft gas turbine engine high pressure compressor provides a cost-effective and reliable means for passive improvement of incidence over a wide range of operating conditions of the variable cycle aircraft gas turbine engine. More specifically, the methods and apparatus described herein facilitate maintaining a less negative angle of incidence on the main vanes of the variable cycle aircraft gas turbine engine compressor than would otherwise be expected. As a result, the methods and apparatus described herein facilitate improving performance, efficiency, and operability of the variable cycle aircraft gas turbine engine, in addition to increasing a life of the variable cycle aircraft gas turbine engine compressor in a cost-effective and reliable manner.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A variable cycle aircraft gas turbine engine comprising:
    a variable area device positioned to selectively control a flow of fluid through at least a portion of said variable cycle aircraft gas turbine engine that varies at least one of a bypass ratio (BPR) and a fan pressure ratio (FPR) of the variable cycle aircraft gas turbine engine; and
    a compressor configured to receive a variable amount of air during different flight conditions, said compressor comprising a row of stationary vane pairs including:
        a first row of main vanes extending radially inwardly from a casing of the compressor and spaced circumferentially about a first axial location of said casing, each main vane of said first row of main vanes comprising a vane root coupled to said casing, a distal tip end, and a main vane extending therebetween, said main vane comprising a first height from said casing to the distal tip end, a chord length between a leading edge of said main vane and a trailing edge of said main vane, and a thickness;
        a second row of auxiliary vanes extending radially inwardly from said casing and spaced circumferentially about a second axial location of said casing, said second axial location is different from said first axial location, each auxiliary vane of said second row of auxiliary vanes comprising an auxiliary vane root coupled to said casing, a distal tip end, and an auxiliary vane body extending therebetween, said auxiliary vane comprising a second height from said casing to the distal tip end, a chord length between a leading edge of said auxiliary vane and a trailing edge of said auxiliary vane, and a thickness; and
        a flow channel defined between a pressure side of an auxiliary vane of said second row of auxiliary vanes and a suction side of an adjacent main vane of said first row of main vanes.

2. The variable cycle aircraft gas turbine engine of claim 1, wherein said flow channel extends between said pressure side of said auxiliary vane and said suction side of said main vane from said leading edge of said main vane to said trailing edge of said auxiliary vane.

3. The variable cycle aircraft gas turbine engine of claim 1, wherein said flow channel extends between said pressure side of said auxiliary vane and said suction side of said main vane from said leading edge of said main vane to a position forward of a local maximum thickness of said main vane.

4. The variable cycle aircraft gas turbine engine of claim 1, wherein said leading edge of said auxiliary vane is positioned axially forward of said leading edge of said main vane.

5. The variable cycle aircraft gas turbine engine of claim 1, wherein said row of stationary vane pairs forms a later stage of the compressor.

6. The variable cycle aircraft gas turbine engine of claim 1, wherein said second height is approximately equal to said first height.

7. The variable cycle aircraft gas turbine engine of claim 1, wherein said second height is less than said first height.

8. The variable cycle aircraft gas turbine engine of claim 1, further comprising:
a bypass duct; and
a plurality of variable vanes proximate an upstream end of said bypass duct configured to modulate relative amounts of flow in a core engine flow stream and a bypass flow stream.

9. The variable cycle aircraft gas turbine engine of claim 1, further comprising variable pitch inlet guide vanes positioned upstream of a high pressure turbine of said variable cycle aircraft gas turbine engine.

10. The variable cycle aircraft gas turbine engine of claim 1, further comprising variable pitch inlet guide vanes positioned upstream of a low pressure turbine, variable pitch inlet guide vanes configured to vary a back pressure on a high pressure turbine of said variable cycle aircraft gas turbine engine to control a speed of said high pressure turbine.

11. A method of managing negative incidence in stator vanes of a variable cycle aircraft gas turbine engine compressor, said method comprising:
channeling a flow of fluid through a variable area device positioned to selectively control the flow of fluid through at least a portion of the variable cycle aircraft gas turbine engine that varies at least one of a bypass ratio (BPR) and a fan pressure ratio (FPR) of the variable cycle aircraft gas turbine engine;
channeling a flow of fluid to a row of a plurality of compressor vane assemblies of the compressor, the plurality of compressor vane assemblies spaced about a surface of a casing of the compressor, the plurality of compressor vane assemblies including a row of compressor main vanes interdigitated with a row of compressor auxiliary vanes; and
channeling at least a portion of the flow of fluid through a flow channel defined by a pressure side of a compressor auxiliary vane of said row of compressor auxiliary vanes and a suction side of an adjacent compressor main vane of said row of compressor main vanes.

12. The method of claim 11, further comprising channeling the flow of fluid along the pressure side of the compressor auxiliary vane before the flow of fluid enters the flow channel.

13. The method of claim 11, further comprising maintaining a predetermined angle of incidence on the compressor main vane using the flow of fluid through the flow channel.

14. The method of claim 11, further comprising maintaining an angle of incidence on the compressor main vane less than or equal to sixty degrees.

15. The method of claim 11, further comprising maintaining an angle of incidence on the compressor main vane less than or equal to twenty degrees.

16. The method of claim 11, further comprising maintaining a non-negative angle of incidence on the compressor main vane using the flow of fluid through the flow channel.

17. A variable cycle aircraft gas turbine engine comprising:
a variable area device positioned to selectively control a flow of fluid through at least a portion of said variable cycle aircraft gas turbine engine that varies at least one of a bypass ratio (BPR) and a fan pressure ratio (FPR) of the variable cycle aircraft gas turbine engine;
a compressor rotor assembly comprising one or more bladed members coupled through a shaft rotatable about a longitudinal axis;
a stationary compressor casing at least partially surrounding said compressor rotor assembly;
a plurality of compressor vane pairs spaced circumferentially about a first axial location of said stationary compressor casing, each of said plurality of compressor vane pairs includes a main vane and an auxiliary vane, each main vane includes a leading edge, a trailing edge, and a main vane body extending therebetween, each auxiliary vane includes a leading edge, a trailing edge, and an auxiliary vane body extending therebetween, each of said main vanes and said auxiliary vanes includes a suction side and a pressure side; and
a flow channel defined between said pressure side of said auxiliary vane and said suction side of said main vane proximate said leading edge of said main vane.

18. The variable cycle aircraft gas turbine engine of claim 17, wherein said flow channel extends between said pressure side of said auxiliary vane and said suction side of said main vane from said leading edge of said main vane to said trailing edge of said auxiliary vane.

19. The variable cycle aircraft gas turbine engine of claim 17, wherein said flow channel extends between said pressure side of said auxiliary vane and said suction side of said main vane from said leading edge of said main vane to a position forward of a local maximum thickness of said main vane.

20. The variable cycle aircraft gas turbine engine of claim 17, wherein said leading edge of said main vane is positioned axially forward of said leading edge of said auxiliary vane.

21. The variable cycle aircraft gas turbine engine of claim 17, wherein said compressor rotor assembly comprises a high pressure compressor.

22. The variable cycle aircraft gas turbine engine of claim 17, wherein said plurality of compressor vane pairs form a later stage of a compressor.

23. The variable cycle aircraft gas turbine engine of claim 17, further comprising an adaptive cycle engine.

* * * * *